No. 631,831. Patented Aug. 29, 1899.
G. S. STRONG.
CLUTCH AND CLUTCH ACTUATED MECHANISM.
(Application filed Dec. 7, 1898.)
(No Model.) 3 Sheets—Sheet 1.
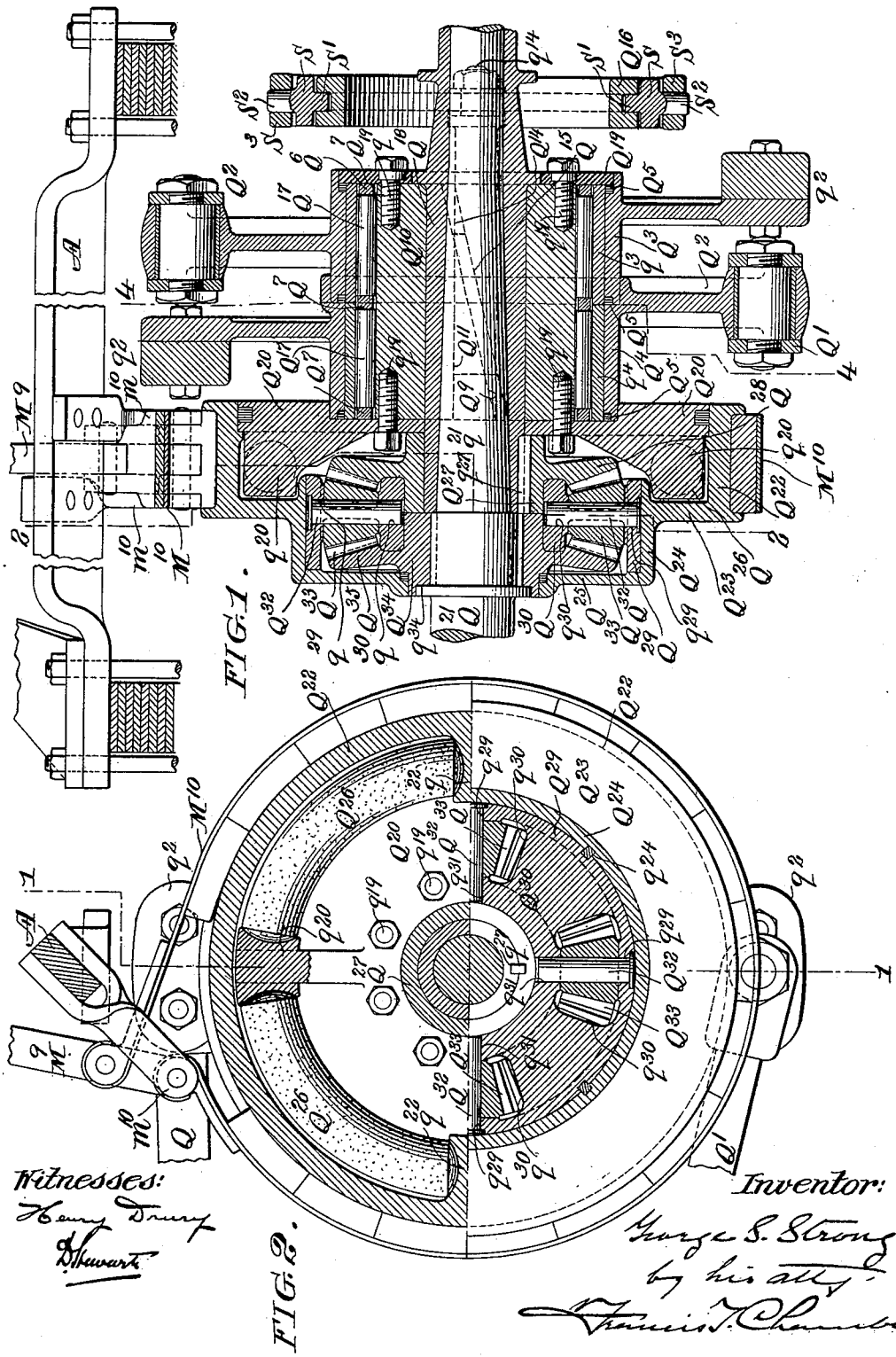

No. 631,831. Patented Aug. 29, 1899.
G. S. STRONG.
CLUTCH AND CLUTCH ACTUATED MECHANISM.
(Application filed Dec. 7, 1898.)
(No Model.) 3 Sheets—Sheet 2.
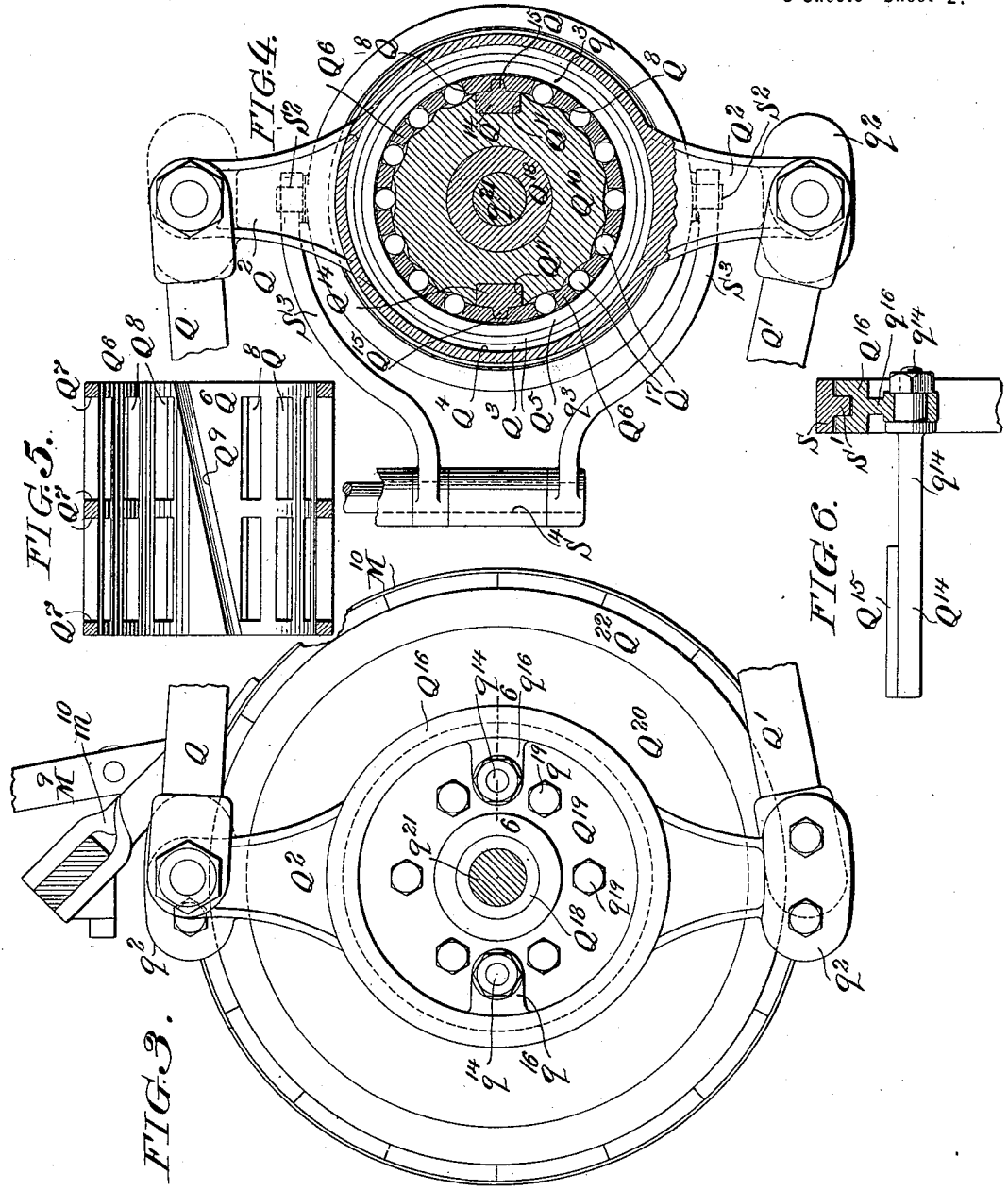
Witnesses:
Henry Drury
D. Hewatt
Inventor:
George S. Strong
by his atty
Francis T. Chambers No. 631,831. Patented Aug. 29, 1899.
G. S. STRONG.
CLUTCH AND CLUTCH ACTUATED MECHANISM.
(Application filed Dec. 7, 1898.)
(No Model.) 3 Sheets—Sheet 3.
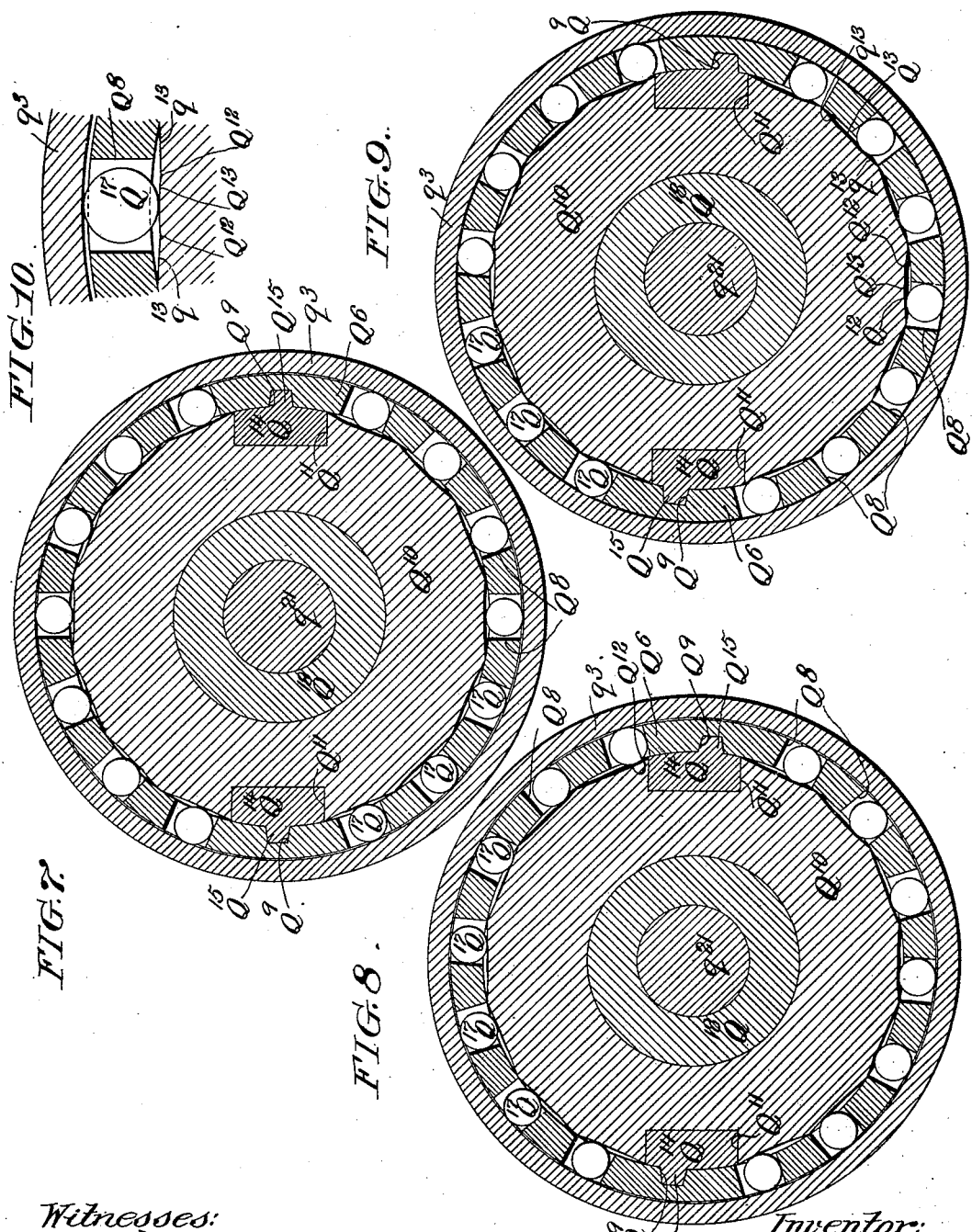
Witnesses:
Inventor:
George S. Strong
by his atty

UNITED STATES PATENT OFFICE.

GEORGE S. STRONG, OF NEW YORK, N. Y., ASSIGNOR TO JOHN P. MURPHY, OF PHILADELPHIA, PENNSYLVANIA.

CLUTCH AND CLUTCH-ACTUATED MECHANISM.

SPECIFICATION forming part of Letters Patent No. 631,831, dated August 29, 1899.

Application filed December 7, 1898. Serial No. 698,514. (No model.)

*To all whom it may concern:*

Be it known that I, GEORGE S. STRONG, a citizen of the United States of America, residing in the city, county, and State of New York, have invented certain new and useful Improvements in Clutch and Clutch-Actuated Mechanism, of which the following is a true and exact description, reference being had to the accompanying drawings, which form a part thereof.

My invention relates to the construction of clutches and of mechanism whereby the action of the clutch is transmitted to a shaft or shafts.

The object of my invention is to improve the clutch and mechanism connected therewith in various details, rendering it more effective and more easily manageable.

The nature of my improvements will be best understood as described in connection with the drawings, in which they are illustrated and in which—

Figure 1 is a central longitudinal section through a clutch and its connections constructed in accordance with my improvements and as shown especially designed and adapted for imparting motion to the driving-wheels of an automobile vehicle, the section being taken as on the line 1 1 of Fig. 2. Fig. 2 is a cross-section taken on the line 2 2 of Fig. 1. Fig. 3 is an end view of the clutch viewed from the right of Fig. 1. Fig. 4 is a cross-section on the line 4 4 of Fig. 1. Fig. 5 is a view of the roller-cage shown in central transverse section. Fig. 6 is a side elevation of the cage-actuating feather and its connecting-ring, the ring being shown as on the section-line 6 6 of Fig. 3. Figs. 7, 8, and 9 are transverse sections through the clutch, showing the progressive action of the cage in shifting the clutch-rollers; and Fig. 10 is an enlarged fragmentary view illustrating the detailed construction of the clutch-drum.

A, Figs. 1, 2, and 3, illustrates a portion of the running-gear of the automobile wagon in connection with which my improved clutch is used.

Q and Q' are connecting-rods, given a reciprocating movement by a motor (not shown) carried on the running-gear, the said rods being moved simultaneously in the same direction by connecting both, for instance, with a crank-pin and being connected at their other ends, as shown, with lever-arms $Q^2 Q^2$, extending the one upward and the other downward from clutch-rings $Q^3$ and $Q^4$, which, as shown, (see Fig. 1,) are provided with inner cylindrical linings $q^3 q^4$, preferably formed of hardened steel.

$q^2 q^2$ are counterbalances arranged on each clutch-ring opposite to its arm $Q^2$.

$Q^5 Q^5$ (see Fig. 1) are packing-rings.

$Q^6$ is a clutch-roller cage formed with a series of chambers $Q^8$, corresponding with the number of facets on the drum, the said chambers being somewhat greater in width than the diameter of the rollers used in connection with the cage and being equal in length to the length of the rollers and formed with squared ends $Q^7$ to fit against the squared ends of the rollers contained in the chambers, this construction being to prevent the rollers from getting out of parallel with each other.

$Q^9 Q^9$ indicate spiral grooves formed in the inner face of the cage, on opposite sides thereof.

$Q^{10}$ is the clutch-drum, which is formed with surface facets $Q^{13} Q^{12} Q^{12}$, of which the surface $Q^{13}$ is cylindrical, concentric, or substantially so, to the center of the drum, while the surfaces $Q^{12} Q^{12}$ extend outward from this cylindrical surface at very obtuse angles. In practice I have made the breadth of the surfaces $Q^{13}$ one-half of an inch.

$Q^{11} Q^{11}$ indicate longitudinal slots formed on opposite sides of the drum in position to come opposite to the spiral grooves $Q^9$ in the cage.

$Q^{14} Q^{14}$ are keys fitting and longitudinally movable in the grooves $Q^{11}$ and formed on their outer surfaces with spiral keys $Q^{15}$, fitting and moving in the spiral grooves $Q^9$ of the cage. These keys are formed or provided with extensions $q^{14}$, (see Fig. 6,) which are secured, as shown, to inwardly-extending lugs $q^{16}$ of an annularly-grooved ring $Q^{16}$. In the annular groove of this ring portions S' of blocks S, having studs $S^2$ projecting outwardly from them and pivotally connected with the ends of levers $S^3 S^3$, secured to a shaft $S^4$, by moving which the ring $Q^{16}$ and the keys attached to it are moved out or in in the direction and to the extent required.

$Q^{17} Q^{17}$, &c., are clutch-rollers, one of which is placed in each chamber of the clutch-ring and which are of a diameter somewhat greater, of course, than the thickness of the walls of the cage and such as will make a quite close fit between the cylindrical surfaces $Q^{13}$ of the drum and the rings $Q^3 Q^4$, or rather their inner linings $q^3 q^4$. In practice I have made the diameter of the rollers about one-eighth of an inch less than the breadth of the chambers in the roller-cage, and, as already stated, I form the rollers with squared ends, which fit neatly against the squared ends of the cage-chambers.

It is of course obvious that as the keys $Q^{14} Q^{14}$ are moved in or out they will shift the position of the cage to the right or left, as the case may be, moving the rollers over the cylindrical sections $Q^{13}$ in contact with one or the other of the oblique surfaces $Q^{12}$, as may be desired. In Fig. 7 I have represented the cage as in its central and non-operative position, in which the rollers are not in contact with either surface $Q^{12}$ and in which a rotary movement of the ring will simply rotate the rollers without tending to rotate the drum. Owing to the construction which I have described, in which the chambers of the cage are wider than the rollers, those rollers which are on the left of a vertical section-line are one-eighth of an inch closer to the inclined surfaces $Q^{12}$. Extending to the left then are these rollers on the right-hand side of the line, and also of course the rollers on the right-hand side are one-eighth of an inch nearer to the inclined surfaces $Q^{13}$, extending to the right, than are those on the left-hand side of the line. Assuming now for illustration that the roller-cage is shifted so as to engage the members of the clutch in a direction to drive the drum toward the right, the parts are first brought to the position shown in Fig. 8, in which the rollers lying to the right of the central vertical line first come in contact with the inclines $Q^{12}$, lying to the right of the surface $Q^{13}$, while the rollers to the left of the vertical line are still one-eighth of an inch away. The further movement of the cage to the position shown in Fig. 9 simply brings the rollers to the left of the vertical line into operative position without moving the rollers to the right of the line, as is shown in this figure of the drawings, and by which it is clear that the surfaces of the cage lying in front of or to the right of the rollers is moved away from contact with the rollers, so that there is nothing in front of them to prevent their running forward on the inclined surfaces $Q^{12}$ to such a degree as may be possible for them. In this position any movement of the clutch-ring to the right causes the clutch members to engage and rotate the drum, while any movement to the left causes a disengagement of the clutch members, permitting the ring to move "backward," so to speak, without affecting the movement of the drum, and this occurs with an almost imperceptible shifting of position of the rollers and in my construction practically without any appreciable noise.

$Q^{18}$ is a shaft upon which the clutch-drum $Q^{10}$ is in the construction shown journaled, and, as shown, the shaft $Q^{18}$ is hollow and formed to fit over the slightly-conical end $q^{21}$ of a solid shaft $Q^{21}$, extending to the left of the hollow shaft $Q^{18}$.

$Q^{19}$ is an annular ring fitting on the shaft $Q^{18}$, as shown, and secured, as by bolts $q^{19}$, to the right-hand end of the drum $Q^{10}$, its outer edge extending beyond the drum and forming, as indicated, a tight joint with the end of the ring $Q^3$. On the other side of the drum $Q^{10}$ an annular plate is secured, also by bolts $q^{19}$, this plate forming a tight joint with the left-hand side of the ring $Q^4$ and having on its outer face projections $q^{20}$ to form bearings for the springs, to be hereinafter described.

$Q^{22} Q^{23} Q^{24} Q^{25}$ is an irregularly-shaped casket which forms with the plate $Q^{20}$ a box around the abutted portions of the shafts $Q^{18}$ and $Q^{21}$. From its walls $Q^{22} Q^{23}$ extend flanges $q^{22}$, (see Fig. 2,) which "interlock," so to speak, with the flanges $q^{20}$ of the plate $Q^{20}$, and between the flanges of the box and plate I secure springs $Q^{26}$, which may conveniently be made of rubber and by which the plate $Q^{22}$ and the box are held together.

Secured to the end of the shaft $Q^{18}$, as by a key $q^{27}$, is the hub $Q^{27}$ of a bevel gear-wheel $Q^{28}$, and secured in the same or any convenient way to the abutted portion of the shaft $Q^{21}$ is the hub $Q^{34}$ of a bevel gear-wheel $Q^{35}$.

$Q^{29}$ and $Q^{30}$ indicate an annular spider or frame, the portion $Q^{29}$ of which is secured, as by means of keys $q^{24}$, to the portion $Q^{24}$ of the box and which is formed with openings $q^{30}$, in which are placed bevel gear-wheels $Q^{33}$, journaled on pins $Q^{32}$, extending across the openings $q^{30}$ and secured on the outside and inside thereof, as indicated at $q^{29}$ and $q^{31}$. The bevel-wheels $Q^{33}$ have their teeth engaged on opposite sides with the bevel gear-wheels $Q^{28}$ and $Q^{35}$. The arrangement of the gear-wheels coupling the shafts $Q^{21}$ and $Q^{18}$ together, as described, is in its general features a familiar compensating device, by means of which in case of the turning of the vehicles the driving-wheel on the outside is permitted to move, as it must, on a longer path than the driving-wheel on the inside without disturbing the application of power to either of them. The function of the springs $Q^{26}$ is of course to act as an equalizing device between the clutches and the shafts upon which the clutches operate—that is, in my new construction these springs equalize the application of the power to the compensating device through which the power ultimately reaches the driving-axles, a feature of construction which I believe to be entirely new with me, as is also the construction of the plate $Q^{20}$ and the irregularly-shaped box-casting by which the equalizing and compensating devices described are inclosed and protected from the dirt.

I form on the box as shown on its section $Q^{22}$, a brake-drum surface, upon which fits the brake-band, (indicated at $M^{10}$,) said band being secured at one end to fixed arms $m^{10}$ and at the other end to a lever $M^9$, by means of which the brake-band can be tightened at will. This feature of construction is of value, because by its means I apply the braking pressure equally to both driving-wheels at all times, the resistance of the brake acting through the compensating device just as does the power of clutches.

Having now described my invention, what I claim as new, and desire to secure by Letters Patent, is—

1. A clutch-drum having a series of facets on its face each consisting of a central surface $Q^{13}$ substantially radial to the center of the drum and lateral surfaces $q^{13}$ $q^{13}$ forming a very obtuse angle with said central surface in combination with a clutch-ring with a cylindrical inner face, and a series of rollers interposed between the drum and ring and adapted to fit closely between the surfaces $Q^{13}$ and the clutch-ring.

2. A clutch-drum having a series of facets on its face each consisting of a central surface $Q^{13}$ substantially radial to the center of the drum and lateral surfaces $q^{13}$ $q^{13}$ forming a very obtuse angle with said central surface in combination with a clutch-ring with a cylindrical inner face, a series of square-ended rollers interposed between the drum and ring and adapted to fit closely between the surfaces $Q^{13}$ and the clutch-ring, a roller-cage $Q^6$ angularly adjustable on the clutch-drum formed with a series of rectangular chambers $Q^8$ of length equal to the rollers and of breadth somewhat greater than the diameter of the rollers and means for adjusting the cage.

3. The combination with a clutch-drum as $Q^{10}$ clutch-ring and rollers working between said ring and drum, of a roller-cage situated between the ring and drum, one or more keys uniting the drum and cage having a straight connection with the one and a spiral connection with the other and means for moving said key or keys to shift the angular position of the cage on the drum.

4. The combination with a clutch-drum as $Q^{10}$ clutch-ring and rollers working between said ring and drum of a roller-cage situated beneath the ring and drum, two keys uniting the drum and cage having a straight connection with the one and a spiral connection with the other, a grooved annular ring secured to extensions of the keys aforesaid and lever-arms engaging the groove of said ring for moving it and the keys and thus adjusting the angular position of the cage on the drum.

5. The combination with intermittently-acting clutch mechanism of two shafts to be driven thereby, an equalizing mechanism coupling the two shafts as described and whereby they are directly actuated and a yielding connection between the said equalizing device and the intermittently-acting clutch.

6. The combination with intermittently-acting clutch mechanism of two shafts to be driven thereby arranged concentrically with the clutch, a plate $Q^{20}$ secured to the clutch-drum and formed with outwardly-extending wings $q^{20}$, bevel gear-wheels $Q^{28}$ and $Q^{35}$ one secured to each shaft, a casing $Q^{22}$ $Q^{23}$ $Q^{24}$ $Q^{25}$ forming a close joint with the edge of plate $Q^{20}$ and inclosing all, the gear-wheels aforesaid said casing having internal wings $q^{22}$ arranged to interlock with wings $q^{20}$, springs interposed between said wings $q^{22}$ and $q^{20}$, an annular spider secured on the inside of the casing to afford support to the journals of bevel-wheels $Q^{33}$ and bevel-wheels $Q^{33}$ secured in said spider and in engagement with bevels $Q^{28}$ and $Q^{35}$.

7. The combination with intermittently-acting clutch mechanism of two shafts to be driven thereby arranged concentrically with the clutch, a plate $Q^{20}$ secured to the clutch-drum and formed with outwardly-extending wings $q^{20}$, bevel gear-wheels $Q^{28}$ and $Q^{35}$ one secured to each shaft, a casing $Q^{22}$ $Q^{23}$ $Q^{24}$ $Q^{25}$ forming a close joint with the edge of plate $Q^{20}$ and inclosing the gear-wheels aforesaid said casing having internal wings $q^{22}$ arranged to interlock with wings $q^{20}$, springs interposed between said wings $q^{22}$ and $q^{20}$, an annular spider secured on the inside of the casing to afford support to the journals of bevel-wheels $Q^{33}$, bevel-wheels $Q^{33}$ secured in said spider and in engagement with bevels $Q^{28}$ and $Q^{35}$ and a brake arranged to operate on the casing aforesaid.

8. A clutch-drum having a series of facets on its face in combination with a clutch-ring with a cylindrical inner face, a series of square-ended rollers interposed between the drum and ring, a cylindrical roller-cage $Q^6$ situated between the drum and ring and angularly adjustable on the clutch-drum, said cage being formed with a series of rectangular chambers $Q^8$ of length equal to the rollers and of breadth somewhat greater than the diameter of the rollers and means for adjusting the cage.

GEORGE S. STRONG.

Witnesses:
   CHAS. F. MYERS,
   D. STEWART.